May 7, 1968

R. J. WILKINSON 3,382,010

FEEDER APPARATUS

Filed Aug. 16, 1966

INVENTOR
ROBERT J. WILKINSON
BY
*John Lezoley*
ATTORNEY

May 7, 1968 R. J. WILKINSON 3,382,010
FEEDER APPARATUS

Filed Aug. 16, 1966 3 Sheets-Sheet 2

INVENTOR
ROBERT J. WILKINSON
BY
John Lezdey
ATTORNEY

May 7, 1968 R. J. WILKINSON 3,382,010
FEEDER APPARATUS
Filed Aug. 16, 1966 3 Sheets-Sheet 3
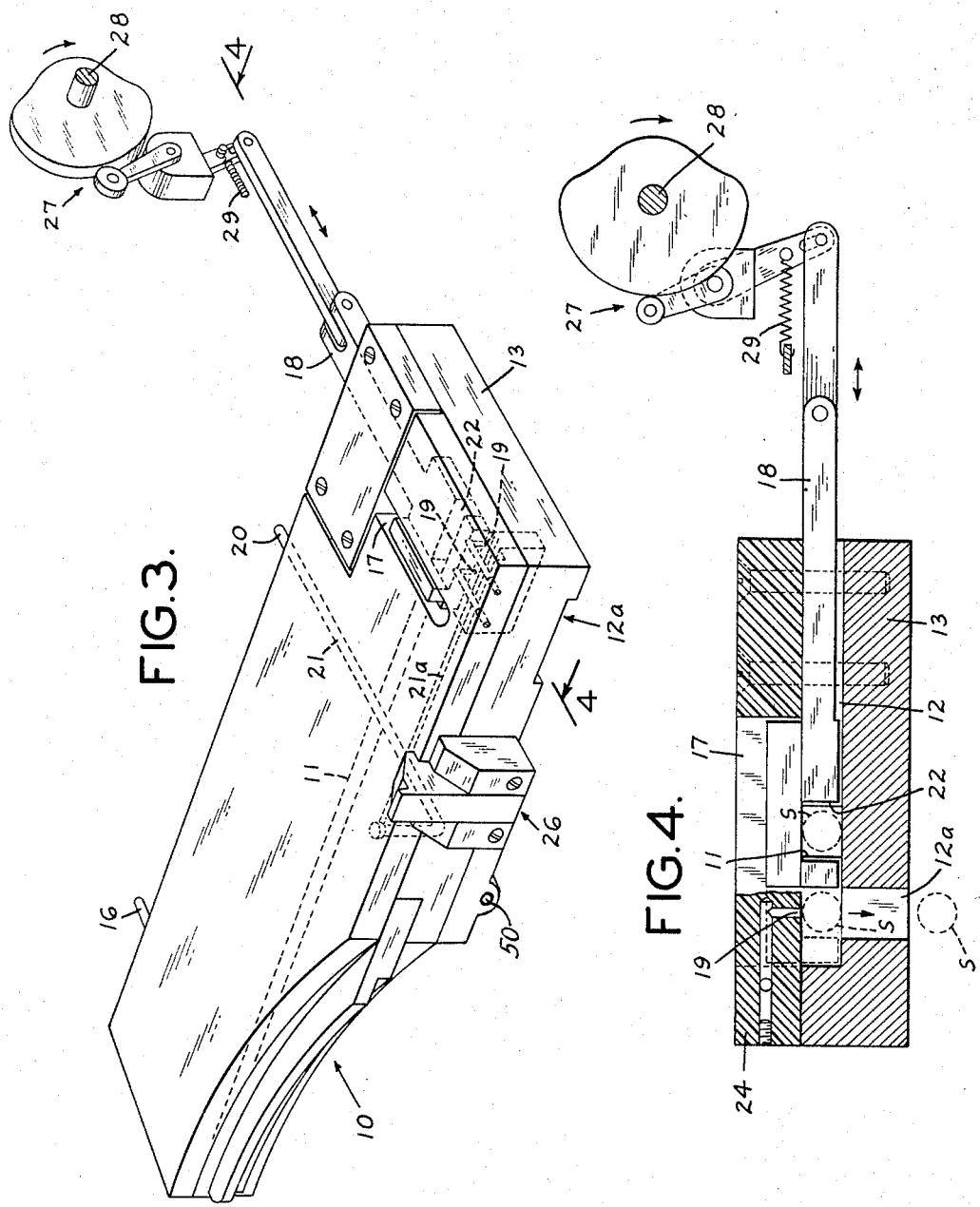
INVENTOR
ROBERT J. WILKINSON
BY
John Leydey
ATTORNEY

United States Patent Office 3,382,010
Patented May 7, 1968

3,382,010
FEEDER APPARATUS
Robert J. Wilkinson, Medford Lakes, Burlington, N.J., assignor to American Home Products Corporation, New York, N.Y., a corporation of Delaware
Filed Aug. 16, 1966, Ser. No. 572,803
16 Claims. (Cl. 302—2)

ABSTRACT OF THE DISCLOSURE

An apparatus and method are described for feeding elongated objects, such as suppositories, from an orienting and aligning apparatus onto apparatus for further processing, such as wrapping. The apparatus is made up of a frame having a main channel through which the suppositories pass, and a series of passageways in the frame for conducting compressed air into contact with the suppositories and so suspend them during their passage through the main channel. A reciprocating shuttle pushes the suppositories from the end of the main channel into a slot from which they are discharged by compressed air into apparatus for further processing.

---

This invention relates to an apparatus and method for delivering elongated objects of substantially similar configuration to a further processing apparatus.

More particularly, this invention relates to an apparatus and method for automatically feeding a series of elongated objects having a substantially cylindrical body to an additional processing step.

Although not restricted thereto, this invention is particularly useful for feeding roller bearings, medicaments, such as suppositories, and food products such as candies and sausages, from an orienting and aligning apparatus to a further processing apparatus, such as a wrapping machine.

With the increase in production of individually wrapped foods and medicaments, it has become an increasingly greater problem to provide a dependable, rapidly operating and substantially fully automatic means for continuously feeding such objects to a wrapping machine.

Heretofore, it has been known to advance elongated objects from an orienting and aligning device to a wrapping machine by means of belt means and pusher bars. In case of candies and suppositories there were jam-ups and scoring of the objects because of the tendency of the candies and suppositories to stick to each other and the apparatus.

The prior art apparatuses are more complex and have to be cleaned frequently because of the buildup of product caused by the friction of the objects against the apparatus walls and pusher means.

It is the general object of the present invention to avoid and overcome the foregoing and other difficulties and objections to prior art practices by the provision of a more efficient and less expensive device.

More specifically the object of the present invention is to provide an apparatus for automatically feeding a plurality of elongated cylindrical objects from an aligning and orienting apparatus to a further processing apparatus without using manual means.

Further, another object of the present invention is to provide an apparatus for particular utility for feeding generally cylindrical suppositories and similar objects onto a series of receptacles such as the grooves in a rotating platen of a wrapping machine.

It is still another object of the present invention to provide a feeding apparatus of the character referred to above which can be adapted for use with an automatic orienting and aligning device.

A yet further object of the invention is to provide a feeding apparatus that is capable of continuously delivering elongated objects to the discharge end of the device at a rapid and continuous rate with a minimum degree of maintenance.

The aforesaid objects of the present invention, and other objects which will become apparent as the description proceeds, are achieved by providing a device that utilizes an intermittent flow of fluid pressure to propel elongated objects from an orienting and aligning apparatus, through a passageway, a shuttle, and a jet of fluid pressure to rapidly discharge the elongated object from the shuttle onto a further processing apparatus. The intermittent flow of fluid pressure is fed into the passageway by means of ports in said passageway directing the travel of the elongated objects toward the discharge end of the device. The novel arrangement creates a vacuum at the receiving end of the device so as to rapidly receive the elongated objects into the device and further causes suspension of the objects in the passageway because of the pulsating fluid pressure.

A device embracing certain features of the present invention may comprise, in combination with fluid pressure means, a frame having a slot at one end and an internal passageway connecting the slot with the other end for passing the objects across the frame, the passageway may contain a plurality of ports in communication with a first source of fluid pressure for propelling the objects through the passageway, and the slot can contain at least one overhead port communication with a second source of fluid pressure, a bore directly beneath the overhead port, and a means disposed in said slot for carrying the objects entering the slot from the passageway to the bore so that the fluid pressure from the overhead ports will cause the objects to be discharged from the bore onto a further processing apparatus.

A method having certain features of this invention includes the steps of feeding said elongated objects from an aligning apparatus into a passageway, passing a continuous stream of pulsating fluid pressure through the passageway so as to suspend and move the elongated objects through the passageway, and then carrying the elongated objects from the end of the passageway to the influence of a steady stream of fluid pressure so that the elongated objects are passed by means of the fluid pressure onto a further processing apparatus.

For a better understanding of the present invention reference should be made to the accompanying drawings, wherein like numerals of reference indicate similar parts throughout the several views and wherein:

FIG. 3 is a perspective view, similar to FIG. 2 with the cover shown closed in cooperation with a reciprocating means.

FIG. 4 is a vertical section taken along line 4—4 of FIG. 3.

Although the principles of the present invention are broadly applicable to feeder devices for delivery of elongated objects to a further processing apparatus, the present invention is particularly adapted for use in conjunction with an orienting and aligning apparatus and a wrapping machine for suppositories and hence it has been so illustrated and will be so described.

Figure 1:
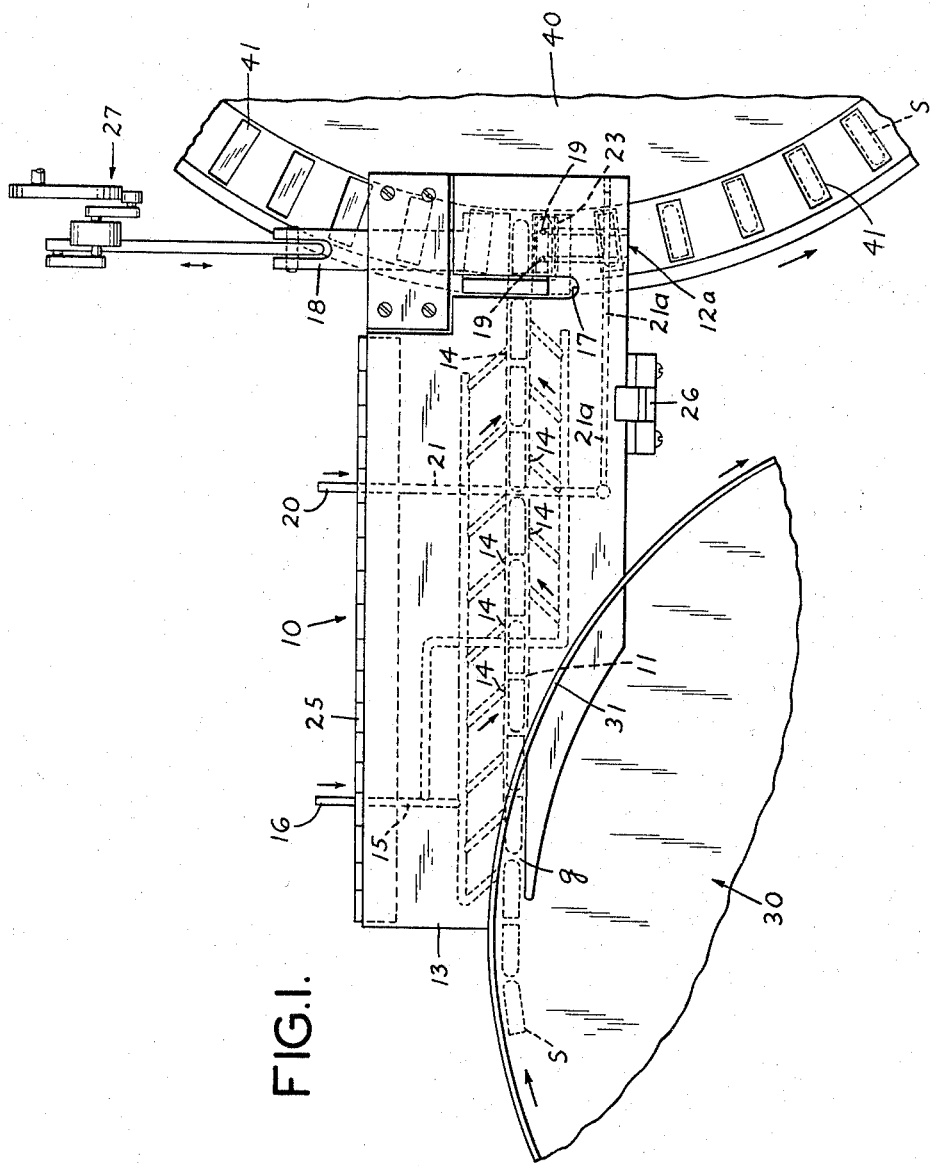
FIG. 1 is a plan view of the feeder device of the present invention in use with an indexing table and orienting and aligning device.

With specific reference to the form of the present invention illustrated in the drawings, and referring particularly to FIG. 1, the improved suppository feeder device of the present invention is indicated generally by the reference numeral 10.

In the operation of the invention, feeder device 10 is mounted at one end of its frame 13 to an orienting and aligning apparatus 30, such as described in United States Patent No. 3,215,251 of F. C. Gleason, with a passageway 11 in the frame 13 communicating with the discharge edge 31 and groove g of the aligning apparatus 30. Passageway 11 extends to the discharge slot 12 of the frame 13 which contains a bore 12a positioned so as to be over the grooves 41 of a rotating platen 40 of a suppository wrapping apparatus, such as described in said United States Patent No. 3,215,251.

A series of ports 14 in passageway 11 communicate with a source of fluid pressure, such as compressed air, through internal passageways 15 of the frame 13 by means of intake 16. In order to suspend the suppositories during travel to the discharge slot 12, pulsating fluid pressure is pumped through intake 16 into the passageway 11 through a series of angular ports 14. To provide a means for venting the intermittent fluid pressure so as to prevent a back pressure from resulting, a pressure escape such as slot 17, is placed near the discharge end of the feeder device 10.

Figure 2:
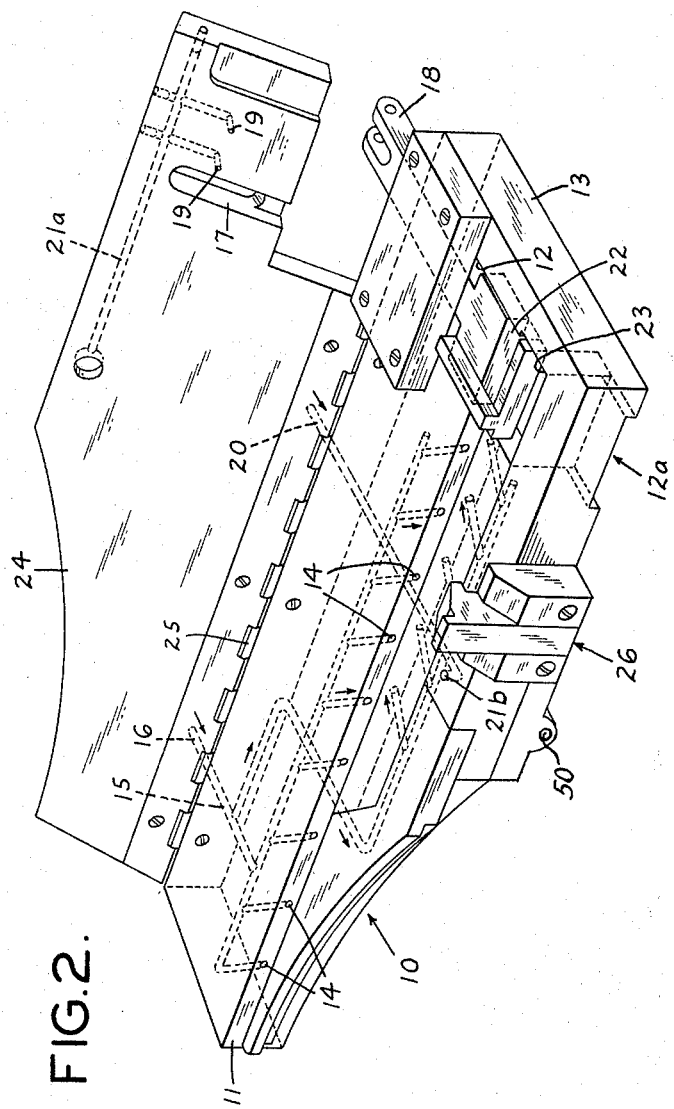
FIG. 2 is a perspective view of the device of the invention with an open cover.

A means may be utilized to transfer the suppositories entering discharge slot 12 from passageway 11 to beneath the fluid pressure, such as compressed air, coming from overhead ports 19 which are used to blow the suppository out through bore 12a (shown in FIG. 2) onto the rotating platen 40 of the wrapping apparatus. One suitable means for transferring the suppositories is a reciprocating shuttle 18 having a slot 22 (as seen in FIG. 2) for carrying the suppository over the bore 12a. The shuttle is synchronized with the movement of the rotating platen 40, by any conventional means, so that the rearward movement of the shuttle 18 will permit a suppository to enter the shuttle slot 22 from the passageway 11 and the forward movement of the shuttle 18 will carry the suppository in shuttle slot 22 under the action of the fluid pressure coming from the overhead ports 19 and thereby discharging the suppository through bore 12a as the grooves 41 of the rotating platen 40 come directly below.

It has been found advantageous to provide a relief 23 over bore 12a on the wall of slot 12, as shown in FIG. 1 so as to prevent the suppositories from sticking to the walls during transfer by the shuttle 18 and when the fluid pressure from the overhead ports 19 is applied.

Referring now to FIG. 2, it will be understood to those skilled in the art that the improved feeder device of the present invention may be provided with a removable cover 24 (shown in the open position), which forms the upper wall of the passageway 11, preferably made from a transparent plastic, such as lucite, so that the operation of the device 10 may be observed and also to facilitate cleaning of the device 10.

The cover 24 may be attached to the frame 13 by means of a hinge 25 and maintained in the closed position by latching means 26. The cover 24 may contain the fluid pressure escape slot 17 and overhead ports 19 which communicate with the source fluid pressure by means of passageway 21a in the cover 24 and connection 21b and passageway 21 in the frame 13.

As shown in FIG. 3 and FIG. 4, the shuttle 18 which is reciprocated by any conventional method, such as cam means 27, contains a slot 22 which becomes aligned with passageway 11 to receive suppositories during the rearward movement. The forward movement of the shuttle 18 moves the suppositories under ports 19 where a stream of fluid pressure from ports 19 blows the suppositories out of the discharge bore 12a onto the grooves 41 of the rotating platen 40.

Cam means 27 causes the shuttle 18 to move to a rearward position and a spring means 29 drives the shuttle 18 to the forward position thereby causing a reciprocating motion. In order to synchronize the forward movement of the shuttle 18 with the advancement of the grooves 41 of the rotating platen 40, a shaft 28 on the cam means 27 may be connected to the means for rotating the platen 40.

It will be recognized by those skilled in the art that the objects of the present invention have been achieved by the provision of an improved feeder device and method for advancing elongated objects that utilizes intermittent fluid pressure to advance the elongated objects to a shuttle that is reciprocated by any conventional means and synchronized with the operation of a further processing apparatus so that the forward movement of the shuttle will bring the elongated object under the influence of a jet of fluid pressure and blow the elongated object onto the desired position of the further processing apparatus.

This improved feeder device is simple and easily adapted to existing apparatuses. Additionally, the device can be adapted to contain a conventional temperature control means 50, such as a heating device, for aid in cleaning or to prevent sticking of the objects to the walls of the passageways during travel.

Obviously, the embodiment shown is exemplary only and a wide variety of embodiments may be devised without departing from the spirit and scope of the invention.

What is claimed is:

1. In combination with fluid pressure means, a device for transferring elongated objects from an aligning apparatus to a further processing apparatus, which device comprises, a frame having a slot at one end and an internal passageway connecting said slot with the other end for passing said objects across said frame, said passageway having a plurality of ports communicating with a first source of fluid pressure for propelling said objects through said passageway, and said slot having at least one overhead port communicating with a second source of fluid pressure, a bore under said overhead port, and means disposed in said slot for carrying said objects entering said slot from said passageway to said bore so that the fluid pressure from said overhead ports will cause said objects to be discharged from said bore onto said further processing apparatus.

2. The device of claim 1 in which said frame includes a temperature control means.

3. The device of claim 1 in which said passageway contains a plurality of ports communicating with a source of intermittent fluid pressure.

4. The device of claim 1 in which said passageway contains a plurality of angular ports communicating with a source of pulsating compressed air.

5. The device of claim 1 in which said frame includes a removable cover forming the upper wall of said internal passageway and containing said overhead port communicating with said second source of fluid pressure and a fluid pressure escape slot.

6. The device of claim 5 in which said cover is plastic.

7. The device of claim 1 in which said means disposed in said slot for carrying said objects comprises a slotted shuttle.

8. A device for feeding suppositories from an orienting and aligning apparatus onto a wrapping apparatus, which device comprises a frame, a first air intake and a second air intake mounted on said frame, said frame having a slot at one end and a first internal passageway connecting said slot with the other end capable of passing said suppositiories therethrough, said first passageway having a plurality of angular ports communicating with a second internal passageway which extends to said first air intake, and said slot having a bore for discharging said suppositories onto a wrapping apparatus, at least one port over said bore communicating with a third internal passageway which extends to said second air intake and a movable slotted shuttle disposed in said slot for carrying suppositories entering said slot from said first internal passageway to said bore whereby air coming from said overhead port blows said suppositories onto said wrapping apparatus.

9. The device of claim 8 in which said first air intake is connected to a source of pulsating compressed air and said second air intake is connected to a source of a steady stream of compressed air.

10. The device of claim 8 in which said frame contains a fluid pressure escape slot.

11. The device of claim 8 in which said frame includes a removable plastic cover forming the upper wall of said first internal passageway and contains said overhead port, a channel from said overhead port to said second internal passageway and a fluid pressure escape slot.

12. The device of claim 8 in which said frame includes a temperature control means.

13. A method of transferring elongated objects from an aligning apparatus to a further processing apparatus which comprises the steps of feeding said elongated objects from said aligning apparatus into a passageway, passing a continuous stream of pulsating fluid pressure through said passageway so as to suspend and move said elongated objects through said passageway, and then carrying said elongated objects from the end of said passageway to the influence of a steady stream of fluid pressure so that the elongated objects are passed onto said further processing apparatus.

14. The method of claim 13 in which the fluid pressure is compressed air.

15. The method of claim 13 in which said elongated object is carried to the influence of the steady stream of fluid pressure by a slotted shuttle.

16. The method of claim 13 wherein said elongated object is a suppository.

References Cited
UNITED STATES PATENTS

| | | | |
|---|---|---|---|
| 3,160,443 | 12/1964 | Harris et al. | 302—2 |
| 3,161,274 | 12/1964 | Lanz | 193—43 |

ANDRES H. NIELSEN, *Primary Examiner.*